United States Patent [19]

Sakakibara et al.

[11] Patent Number: 5,793,925
[45] Date of Patent: Aug. 11, 1998

[54] RECORDING METHOD AND APPARATUS FOR CONTROL TRACK

[75] Inventors: Yoshio Sakakibara, Osaka; Haruo Isaka, Yawata; Kenichi Honjo, Katano; Satoshi Ohyama, Ashiya, all of Japan

[73] Assignee: Matsushita Electric Industrial Co., Ltd., Osaka, Japan

[21] Appl. No.: 607,386

[22] Filed: Feb. 27, 1996

[30] Foreign Application Priority Data

Feb. 27, 1995 [JP] Japan ................. 7-38340

[51] Int. Cl.$^6$ .................................................. H04N 5/76
[52] U.S. Cl. ................................................ 386/57; 386/79
[58] Field of Search .................................. 386/1, 46, 10, 386/62, 79, 74, 23, 57, 52, 95; H04N 5/76

[56] References Cited

U.S. PATENT DOCUMENTS

| | | |
|---|---|---|
| 4,920,425 | 4/1990 | Sekimoto et al. |
| 5,140,435 | 8/1992 | Suzuki et al. ................. 386/46 |
| 5,172,239 | 12/1992 | Nakayama et al. |
| 5,189,568 | 2/1993 | Sim et al. |
| 5,394,248 | 2/1995 | Ohta et al. ................. 366/1 |

FOREIGN PATENT DOCUMENTS

| | | |
|---|---|---|
| 0 548 936 | 6/1993 | European Pat. Off. |
| 60-231947 | 11/1985 | Japan. |
| 6-150639 | 5/1994 | Japan. |
| 2 151 88 | 7/1985 | United Kingdom. |

*Primary Examiner*—Thai Tran
*Assistant Examiner*—Huy Nguyen
*Attorney, Agent, or Firm*—Ratner & Prestia

[57] ABSTRACT

A method and apparatus for recording control pulses on a control track are provided. The control pulses correspond to a number M (where M is an integer equal to or larger than four) of azimuthal tracks on the tape on which the number M of segmented data, obtained by dividing image data corresponding to one frame into the number M of segments, are recorded. One period of the control pulses corresponds to a number N (where N is a divisor of M) of azimuthal tracks, and a duty ratio pattern of the control pulses in a number L (L=M/N) of successive periods corresponding to one frame is different in each of a number K (where K is an integer equal to or larger than two) of successive frames.

14 Claims, 6 Drawing Sheets

RECORDING METHOD AND APPARATUS FOR CONTROL TRACK

BACKGROUND OF THE INVENTION

1. Field of the Invention

The present invention relates to recording method and apparatus for a control track, i.e., method and apparatus for recording a control signal, to be recorded on a tape-shaped medium for controlling running of the tape during a reproduction operation, on a control track in an information recording/reproducing apparatus for recording/reproducing various information such as image, sound and data onto/ from the tape-shaped medium.

2. Description of the Related Art

In various kinds of apparatuses, such as a video cassette recorder (VCR), for recording/reproducing an information signal onto/from an azimuthal track on the tape, a helical scanning is generally performed by a rotational head. In order to obtain an appropriate reproduced signal during a reproduction operation, it is necessary to perform a tracking control for controlling scanning positions so that the head correctly traces the respective tracks. For example, a method using a control signal (hereinafter, simply referred to as a "CTL signal") to be recorded on a control track is employed for such a purpose for apparatuses in VHS mode, a VCR for a broadcasting station and the like.

In the case where a large amount of data is desired to be recorded/reproduced by a digital VCR or the like, a so-called "multi-segment recording" operation, in which an image corresponding to one frame is divided into a large number of segments and then the segments are recorded in the same number of tracks as that of the segments, is sometimes performed. In performing recording/reproducing operations using such a tape format, it is necessary to identify which track is a header of a frame on the tape. In addition, in using a VCR for a broadcasting station, it is also necessary to identify a color frame of a video signal to be recorded (one color frame period consists of two frames in an NTSC method or four frames in a PAL method) on the tape. Therefore, in a conventional VCR, for example, a method such as that shown in FIG. 6 is performed for recording a CTL signal (a case of using a D3 format in a digital VCR is shown in FIG. 6). FIG. 6 shows a recording waveform of the CTL signal, in which a CTL signal corresponding to two pulses is recorded in one field period. By setting the duty ratio of only the CTL pulse at the trailer of each frame to be different from the duty ratio (50%) of the other CTL pulses in the frame, a boundary between adjacent frames can be identified. On the other hand, in the case where the duty ratio of the CTL pulse at the trailer of the frame is 60%, a boundary between adjacent color frames can be identified.

In the case of performing an editing operation, e.g., an assemble editing operation, in a VCR for business use, e.g., a VCR for a broadcasting station, the color frames of the two recording patterns to be connected are required to be continuous at a connection position. Therefore, a portion of a tape, on which signals have already been recorded, is run beforehand during a pre-roll period; running of the tape is adjusted so that the phase of a color frame of a video signal to be recorded corresponds to the phase of a color frame of the reproduced signal; and then a tracking is locked, thereby performing a recording operation actually. In this pre-roll period, the phase of each frame and the phase of each color frame are detected by using a CTL signal, and phases are matched with each other based on the detected result. However, according to a conventional method for recording a CTL signal, phase information of a color frame exist nowhere but at the trailer of the color frame. Accordingly, in the worst case, the phase of the color frame cannot be detected unless information corresponding to one color frame is reproduced. Therefore, it is necessary to set the length of the pre-roll period to be rather long, so that the time required for the editing operation becomes adversely long.

SUMMARY OF THE INVENTION

According to the present invention, a method for recording control pulses on a control track is provided. The control pulses correspond to a number M (where M is an integer equal to or larger than four) of azimuthal tracks on the tape on which the number M of segmented data, obtained by dividing image data corresponding to one frame into the number M of segments, are recorded. In this method, one period of the control pulses corresponds to a number N (where N is a divisor of M) of azimuthal tracks, and a duty ratio pattern of the control pulses in a number L (L=M/N) of successive periods corresponding to one frame is different in each of a number K (where K is an integer equal to or larger than two) of successive frames.

According to another aspect of the present invention, an apparatus for recording control pulses on a control track is provided. The control pulses correspond to a number M (where M is an integer equal to or larger than four) of azimuthal tracks on the tape on which the number M of segmented data, obtained by dividing image data corresponding to one frame into the number M of segments, are recorded. In the apparatus, one period of the control pulses corresponds to a number N (where N is a divisor of M) of azimuthal tracks, and a duty ratio pattern of the control pulses in a number L (L=M/N) of successive periods corresponding to one frame is different in each of a number K (where K is an integer equal to or larger than two) of successive frames.

In one embodiment, the duty ratio pattern includes at least two of three kinds of control pulses having a first, a second and a third duty ratio, respectively; the control pulse having the first duty ratio is located at the same positions in each of the number K of successive frames; and the duty ratio pattern of the control pulses having the second and the third duty ratios is different in each of the number K of successive frames.

In another embodiment, the pattern of the second and the third duty ratios corresponds to a binary code composing of 0 and 1.

In still another embodiment, the binary code indicates a frame number of the number K of successive frames.

In still another embodiment, the control pulse having the first duty ratio, among the control pulses in the number L of periods corresponding to one frame, is an L-th control pulse, and the control pulses having the second and the third duty ratios are located within a range where a first to an (L-1)th control pulses are located.

In still another embodiment, one period of the control pulses corresponds to two azimuthal tracks.

In still another embodiment, the number K of successive frames compose one color frame, and an average duty ratio in the color frame is 50%.

In still another embodiment, the first duty ratio is in a range of 45% to 55%, and one of the second and the third duty ratios is in a range of 35% to 45% and the other is in a range of 55 to 65%.

According to the present invention, phase information corresponding to a number K of frames can be recorded in each of the number K of frames as a duty modulated pattern of a CTL signal.

Thus, the invention described herein makes possible the advantage of providing recording method and apparatus for a control track, in which the phase of a color frame can be detected in a short period of time.

This and other advantages of the present invention will become apparent to those skilled in the art upon reading and understanding the following detailed description with reference to the accompanying figures.

DESCRIPTION OF THE PREFERRED EMBODIMENTS

Hereinafter, an exemplary recording method for a control track according to the present invention will be described with reference to the accompanying drawings.

Figure 1:
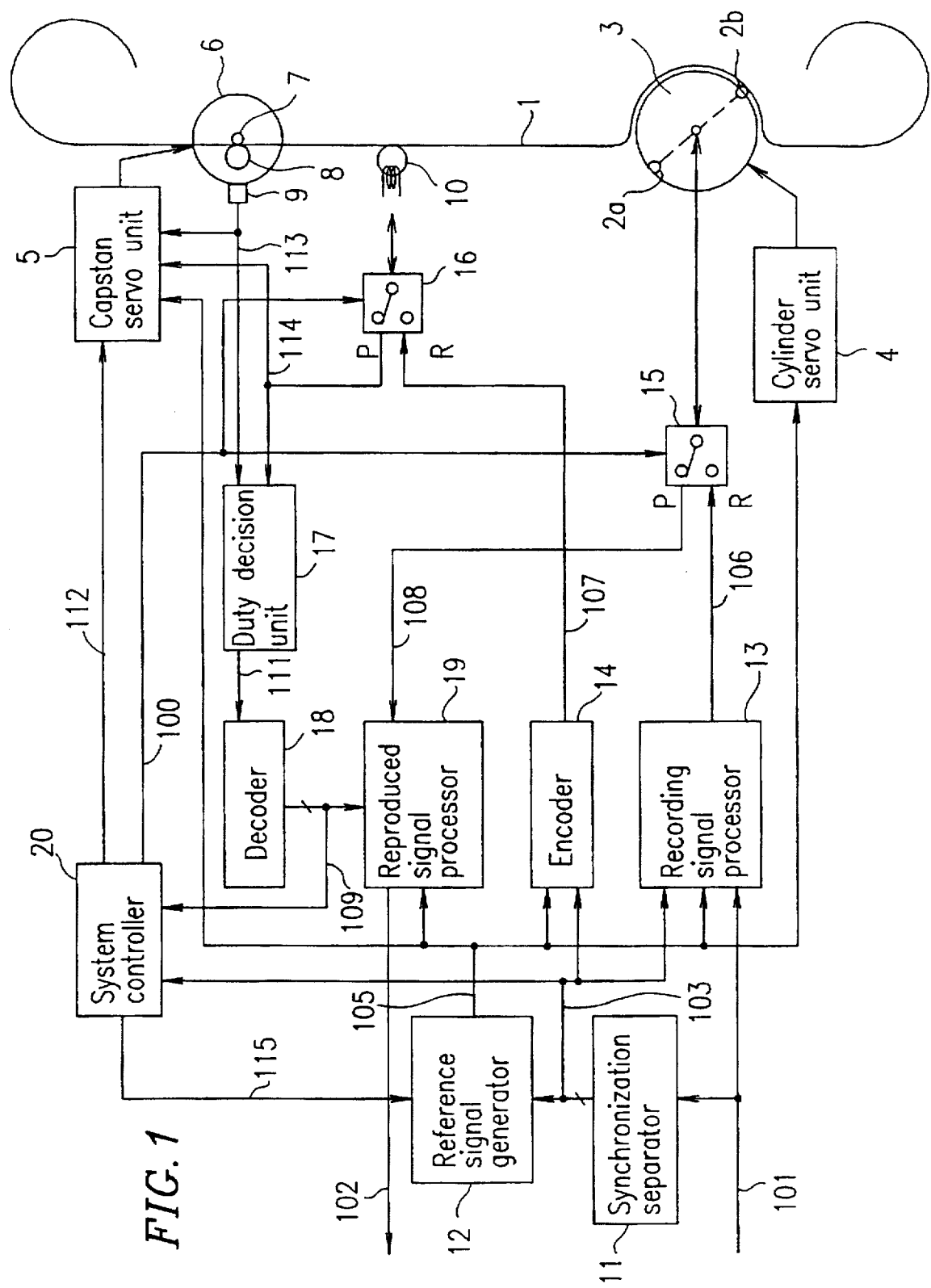
FIG. 1 is a block diagram showing a configuration for a VCR to which a recording method for a control track according to the present invention is applied.

FIG. 1 is a block diagram showing a configuration for a VCR to which the recording method of the invention is applicable. As shown in FIG. 1, the VCR includes: a magnetic tape 1 (hereinafter, simply referred to as a "tape"); magnetic heads (in the same way, referred to as "heads") 2a and 2b having respectively different azimuths; a cylinder 3; a cylinder servo unit 4; a capstan servo unit 5; a capstan motor 6; a capstan 7; a pinch roller 8; a rotation detector 9; a CTL head 10; a synchronization separator 11; a reference signal generator 12; a recording signal processor 13; an encoder 14; switches 15 and 16; a duty decision unit 17; a decoder 18; a reproduced signal processor 19; and a system controller 20.

Figure 2:
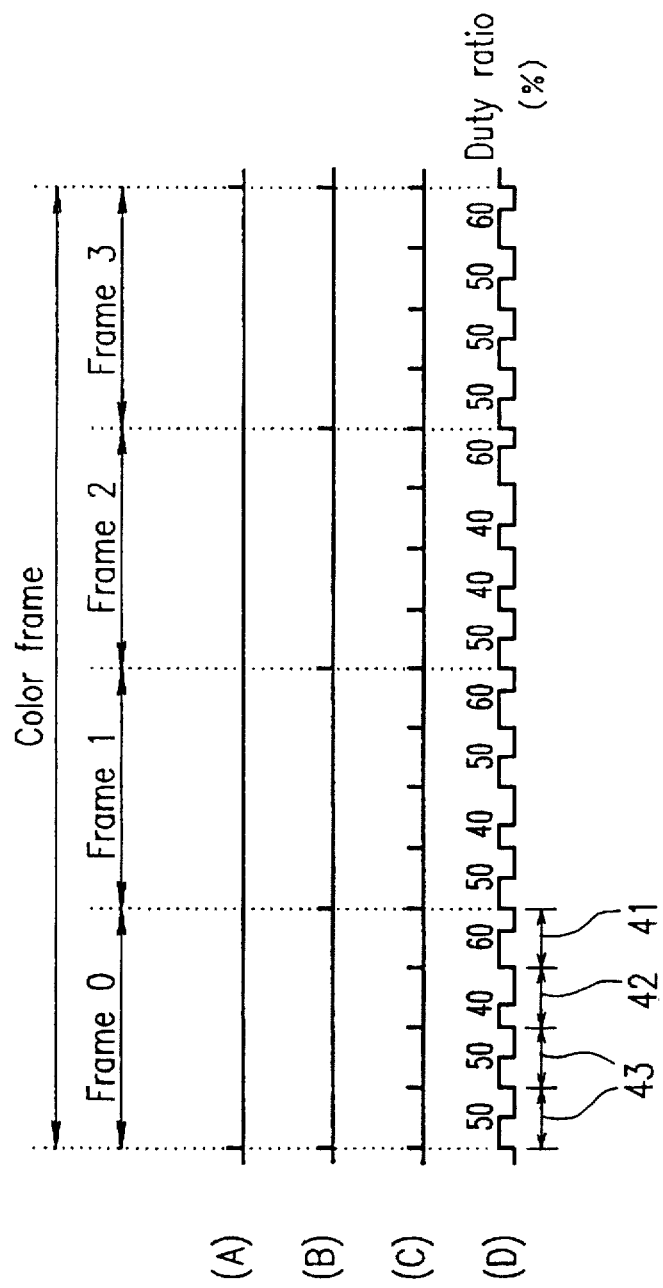
FIG. 2 is a waveform chart showing the waveforms of a recording color frame signal, a recording frame signal, a referential rotation signal and a recording control signal, respectively.

First, the recording operation of the VCR having the above-described configuration will be described. During the recording operation, the switches 15 and 16 select the section on the R side in response to a switching signal 100 supplied from the system controller 20. A recording video signal 101 is supplied to the synchronization separator 11 and the recording signal processor 13. The synchronization separator 11 separates a synchronizing signal from the recording video signal, thereby outputting a recording synchronizing signal 103 consisting of a recording frame signal and a recording color frame signal. In response to the switching signal 115 supplied from the system controller 20, the reference signal generator 12 generates a referential rotation signal 105 for the cylinder 3 based on the recording frame signal of the recording synchronizing signal 103. FIG. 2 shows the waveforms of these signals. It is noted that a video signal is recorded by a PAL method in this case. The waveform of the recording color frame signal (25/4 Hz) which is separated from the recording video signal and produced by the synchronization separator 11 is shown in (A) in FIG. 2; the waveform of the recording frame signal (25 Hz) which is separated from the recording video signal and produced by the synchronization separator 11 is shown in (B) in FIG. 2; and the waveform of the referential rotation signal 105 is shown in (C) in FIG. 2. The referential rotation signal 105 is produced by a phase locked loop (PLL) in the reference signal generator 12 to which a recording frame signal is input. The phase of the referential rotation signal 105 is synchronized with that of the recording frame signal and the frequency of the referential rotation signal 105 is four times as high as that of the recording frame signal.

The cylinder servo unit 4 controls the rotation speed of the cylinder 3 at the same frequency as that of the referential rotation signal 105. Two heads 2a and 2b having respectively different azimuth angles are provided at two opposed positions, separated from each other by 180 degrees, on the same rotation plane of the cylinder 3. The tape 1 is wound in a helical shape around one half portion of the cylinder 3 corresponding to 180 degrees. By rotating the cylinder 3, the tape 1 is scanned sequentially by the heads 2a and 2b. The cylinder servo unit 4 further controls the rotation phase of the cylinder 3 thereby fixing the rotation phase so that the scanning is performed by the heads 2a and 2b within one period of the referential rotation signal 105. As a result, the tape is scanned by the two heads 2a and 2b eight times in total during one frame period.

The capstan servo unit 5 controls the rotation speed of the capstan motor 6 to be a predetermined speed in accordance with the rotation detection signal 113 supplied from the rotation detector 9. The rotation detector 9 outputs a pulse as the rotation detection signal 113 every time the capstan motor has rotated by a predetermined rotation angle. The capstan servo unit 5 controls the rotation speed of the capstan motor 6 so that the pulse period of the rotation detection signal 113 becomes a predetermined value. The axis of the capstan motor 6 is directly connected with the capstan 7. The tape 1 sandwiched between the capstan 7 and the pinch roller 8 is transported in the longitudinal direction thereof as a result of the rotation of the capstan 7.

The recording video signal 101, the recording synchronizing signal 103 and the referential rotation signal 105 are input to the recording signal processor 13. The video information corresponding to one frame is processed by the recording signal processor 13 so as to be finally converted into track data corresponding to eight tracks. Then, the recording signal processor 13 sequentially outputs the track data as the recording signal 106 so as be in synchronization with the referential rotation signal 105 and correspond to the respective heads. The recording signal 106 is supplied to the heads 2a and 2b via the switch 15. As a result, the recording signal 106 is sequentially recorded on a series of azimuthal tracks on the tape 1 by transporting the tape 1 and rotating the cylinder 3 in the above-described manner.

On the other hand, in accordance with the synchronizing signal 103 and the referential rotation signal 105, the encoder 14 generates a recording CTL signal 107 having a waveform shown in (D) in FIG. 2. The recording CTL signal 107 has a rectangular waveform, in which the leading edges are located at regular intervals and are synchronized with those of the referential rotation signal 105 as shown in (C) in FIG. 2. Therefore, these leading edges can be used as positional information for controlling a tracking. On the other hand, the timings of the trailing edges are set so that a duty ratio, i.e., a time ratio of each high level period to one pulse period, is varied in a predetermined order (duty pattern) during one recording color frame period. Herein, a duty ratio DT can be represented as: $DT=100 \cdot TH/(TH+TL)$, where TH is a high level period of a rectangular wave and TL is a low level period thereof. The duty pattern is indicated by the numerals above the waveform in (D) in FIG. 2. For example, in the frame 0, the duty ratio in the last period 41 of the frame is 60%, which indicates an inter-frame boundary; the duty ratio of the period 42 is 40%; and the duty ratio of the other two periods 43 is 50%. In the same way, the duty ratio in the last pulse period is 60% in each of the following frames 1, 2 and 3. However, the duty ratio becomes 40% in respectively different pulse periods in the four frames composing one color frame. In addition, the location of the pulse having a duty ratio of 40% corresponds to the succeeding frame number (herein corresponding to each of the numerals "0" to "3" indicating the order of the frames in one color frame as shown above the waveforms in FIG. 2) expressed by a binary digit. More specifically, the binary digit "0" corresponds to a pulse having a duty ratio of 50%, while the binary digit "1" corresponds to a pulse having a duty ratio of 40%. In the frame 0, the duty pattern is 50, 50 and 40, which indicates a binary digit "001", i.e., the number of the succeeding frame "1".

Figure 3:
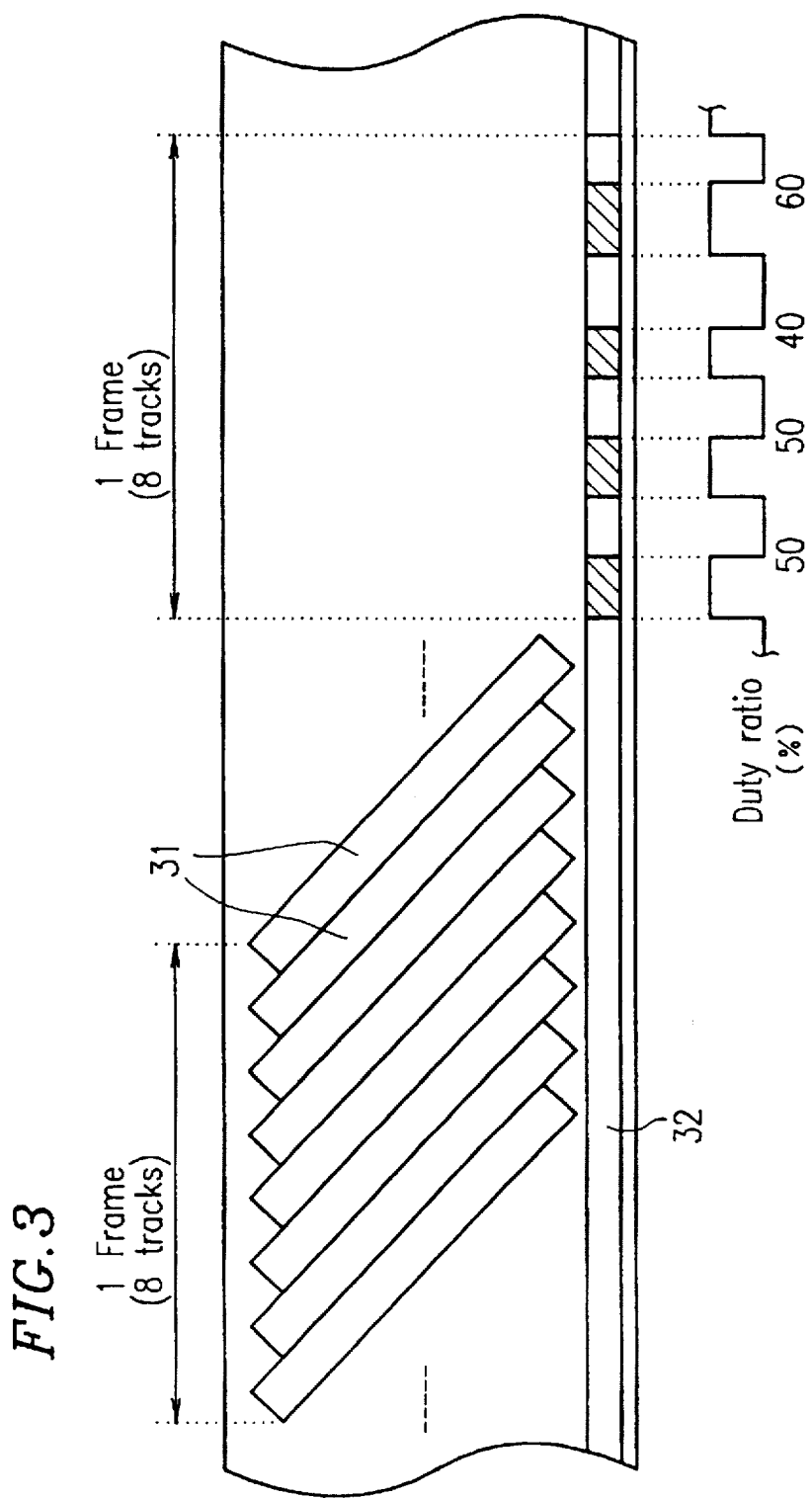
FIG. 3 shows the pattern of the tracks formed on a magnetic tape.

FIG. 3 shows a track pattern thus formed on the tape. A video signal is recorded by the heads 2a and 2b on the tracks 31 shown in FIG. 3. A control track 32 on which a CTL signal is recorded by the CTL head 10 is denoted by 32. In most cases, various kinds of control information such as audio information and a time code is actually recorded by a VCR on the tracks other than those shown in FIG. 3. However, for simplification, these tracks are not shown herein. A control pulse recorded on the control track 32, corresponding to a track 31, is located on the tape so as to be separated from the track 31 by a predetermined distance. These control pulses on the control tracks 32 are directly recorded thereon without being modulated by a high-frequency bias signal.

Next, the reproduction operation will be described. During the reproduction operation, the switches 15 and 16 select the section on the P side in response to the switching signal 100 supplied from the system controller 20. In response to the switching signal 115, the reference signal generator 12 performs a different operation from that in the recording operation. More specifically, the reference signal generator 12 makes an oscillator incorporated therein output a signal having a predetermined frequency as the referential rotation signal 105, independent of the synchronizing signal 103. In accordance with the referential rotation signal 105, the cylinder servo unit 4 controls the speed and the phase of the cylinder 3 in the same way as in the recording operation. On the other hand, the capstan servo unit 5 controls the rotation speed of the capstan motor 6 to be a predetermined speed. As a result, the tape 1 is transported; a CTL signal recorded on the control track on the tape is reproduced by the CTL head 10; and the reproduced signal is supplied through the switch 16 to the capstan servo unit 5 and the duty decision unit 17 as a reproduced CTL signal 114. Since the signal reproduced by the CTL head 10 is obtained by differentiating the recording waveform based on the recording/reproduction characteristics, it is generally necessary to perform a waveform shaping processing for restoring the reproduced signal to a signal corresponding to the recording CTL signal using a hysteresis comparator or the like. However, such a processing will not be described herein. The explanation will be proceeded with while assuming that the waveform of the reproduced CTL signal 114 has already been shaped.

The reproduced CTL signal 114 and the rotation detection signal 113 from the rotation detector 9 for the capstan are supplied to the duty decision unit 17. Using these signals, the duty decision unit 17 sequentially decides if the duty ratio of the reproduced CTL signal 114 is 40%, 50%, or 60%, thereby outputting the decided result as a decision signal 111. The duty ratio is decided by counting the number of pulses of the rotation detection signal 113 supplied during a high level period or a low level period of the reproduced CTL signal 114 and comparing the counted result with a predetermined value. In order to secure the precision for the decision, the rotation detector 9 is required to output a sufficiently large number of pulses, e.g., at least 30 pulses, for every CTL pulse period.

The decoder 18 identifies the duty pattern based on the decision signal 111. More specifically, the decoder 18 identifies the frame number based on the locations of the duty ratios 40% and 50%, and identifies the trailer (or the trailing edge) of the frame by the location of the duty ratio 60%, thereby outputting the identification result as a reproduced color frame signal 109. A specific decision method will be exemplified below. The duty ratios 40% and 50% are made to correspond to logic levels "1" and "0", respectively; every time the two kinds of duty ratios are detected, a logic level corresponding to each of the two duty ratios is input to a shift register (in this case, a two-bit shift register is used) by beginning with the least significant bit; and, at a point where the positional reference or the duty ratio 60% is detected, the data stored in the shift register is output. The reproduced color frame signal is composed of the frame phase information thus obtained and frame timing information. The signal may have any arbitrary signal format. For example, the signal can be composed of pulse signals indicating the timings of the frames and parallel data indicating the frame phases. The frame number detected based on the duty pattern is directly applicable as the frame phase information. On the other hand, it is not until the pulse period terminates or until the header of the next frame that the duty ratio 60% can be detected. Since the binary code indicating the frame number is made to correspond to the number of the succeeding frame, the frame number to be obtained at a point where the duty ratio 60% is detected is equal to the frame number of the frame being reproduced then.

In the explanation described above, a binary code indicating a frame number corresponds to the frame number of the succeeding frame. However, the correspondence between a binary code and a frame number is not limited thereto. Alternatively, a binary code may correspond to the frame number of the frame being reproduced then. In such a case, only "1" is required to be added to the frame number in generating parallel data indicating the phase of the frame.

The referential rotation signal 105 and the reproduced CTL signal 114 are supplied to the capstan servo unit 5. In accordance with the control signal 112 supplied from the system controller 20, the capstan servo unit 5 adjusts the speed of the capstan motor so that the phase of the referential rotation signal 105 and that of the reproduced CTL signal 114 become predetermined values during the reproduction operation, whereby a tracking control can be performed.

Based on the reproduced color frame signal 109, the reproduced signal processor 19 synthesizes and demodulates a reproduced signal 108 obtained from the heads 2a and 2b on a track basis, thereby obtaining a reproduced video signal 102.

Finally, the editing operation will be described. This operation is realizable by combining the reproduction operation and the recording operation with each other. In this example, the editing operation in association with an assemble editing in which the preceding color frame is continuous with the succeeding color frame at an editing point will be described. First, the VCR rewinds (or pre-rolls) the tape by a predetermined tape length from the editing point. Then, the signal is reproduced during the pre-roll period as described above. The switches 15 and 16 select the section on the P side. On the other hand, in the same way as in the recording operation, the recording signal 101 is supplied to the synchronization separator 11, so as to output the synchronizing signal 103. The reference signal generator 12 produces and outputs the referential rotation signal 105 synchronized with the synchronizing signal 103 in the same way as in the recording operation, in this case.

The system controller 20 compares the phase of the reproduced color frame signal 109 and the phase of the synchronizing signal 103 with that of the recording color frame signal, and supplies the control signal 112 for making the capstan servo unit 5 adjust the control speed of the capstan motor 6 so that the phase difference becomes zero. By performing this operation, the phase of the color frame of the recording signal 106 is matched with the phase of the color frame of the reproduced signal 108. In this case, since the reproduced color frame signal 109 supplies the reproduced color frame information on a frame basis, the latency after the reproduction is started until the phase comparison information is obtained corresponds to two frames at most. During this period, the capstan servo unit 5 does not perform a tracking control using the reproduced CTL signal. At a point where the phase difference becomes zero, the system controller 20 makes the capstan servo unit 5 perform a tracking control. After the tracking control is settled, the operation of the capstan servo unit 5 is switched into the operation for recording and then the switches 15 and 16 are turned into the R side, thereby starting an actual recording operation. By performing the above-described operation, the assemble editing can be performed so that the preceding color frame is continuous with the succeeding color frame at a recording start point.

Next, the effects of the present invention will be described. By applying respectively different duty patterns of the CTL signal to the respective frames in one color frame, the phase of the color frame can be detected on a frame basis during the reproduction operation. As a result, the phase of the color frame can be detected in a short period of time and a rapid operation is enabled for an assemble editing and the like. The information is recorded as a difference of the duty patterns of the CTL signal, so that the modulation and the demodulation are realized by performing a simple processing (circuit or software algorithm).

Since a unique duty ratio (or a first duty ratio) is applied to the trailer CTL period in each frame in the duty pattern, the inter-frame boundary can be identified easily. In this example, the first duty ratio is applied to the trailer of the frame. However, so long as the first duty ratio is applied to a particular position in each frame, not only the trailer of one frame but also the particular position of the frame can be advantageously detected.

In addition, if a duty pattern composed of two kinds of duty ratios (a second duty ratio and a third duty ratio) is applied to the remaining CTL periods other than the trailer CTL period (or the CTL period to which the first duty ratio is applied) and respectively different duty patterns are used for the respective frames, the phase in the color frame can be identified on a frame basis. Since the duty pattern indicating the phase corresponds to the binary code of the frame number in the color frame, it is easy to compare the phase with the referential phase during the reproduction operation. In addition, since the CTL period having the first duty ratio for identifying the position (or the timing) of the frame and the CTL periods indicating the binary code are adjacently located, a decoder for identifying the frame number can be formed easily. In this example, the binary code is located prior to the positional reference. Alternatively, the same effects can be attained by inversely locating the code and the reference.

Moreover, the first, the second and the third duty ratios are set to be 60%, 40% and 50%, respectively, in view of the waveform reproducibility during the reproduction operation. In the case where the frequency characteristic curve of the CTL track during the recording/reproduction operations reaches a sufficiently higher frequency region as compared with the frequency of the CTL signal, the reproduced signal from the CTL head comes to have positive and negative impulse shaped waveforms owing to the differentiation characteristics during the recording/reproduction operations. Accordingly, the duty ratio does not affect the reproduced waveform. However, in the case where the signal does not have a sufficiently large band, the impulses come to interfere with each other, so that the amplitude is decreased and it becomes difficult to shape the waveform. Therefore, the duty ratios are set to be around 50% so that the interval between the positive impulse and the negative impulse becomes as uniform as possible. On the other hand, since it is necessary to decide which of the three kinds of duty ratios is taken during the reproduction operation, the decision precision is degraded and a larger number of output pulses are required to be output from the rotation detector for every rotation of the capstan if so close values are selected as the three duty ratios. Accordingly, a normal operation is adversely interrupted. Preferably, one duty ratio is in a range of 45 to 55% (more preferably about 50%), and the other two duty ratios is in a range of 35 to 45% (more preferably about 40%) and in a range of 55 to 65% (more preferably about 60%), respectively. By setting the duty ratios at such values, remarkable effects can be attained, e.g., the speed of transporting the tape can be advantageously increased during a search operation and the like, because of the above-described reasons.

It is noted that, in the case of recording a signal having no color frame information, e.g., a component signal, an exceptional processing may be performed, that is to say, all the duty ratios except for that of the trailer of the frame (pulse having a first duty ratio) may be set to be the same, or pseudo color frame information may be recorded, whereby the signal can be recognized as a component signal by the duty ratios.

Figure 4A:
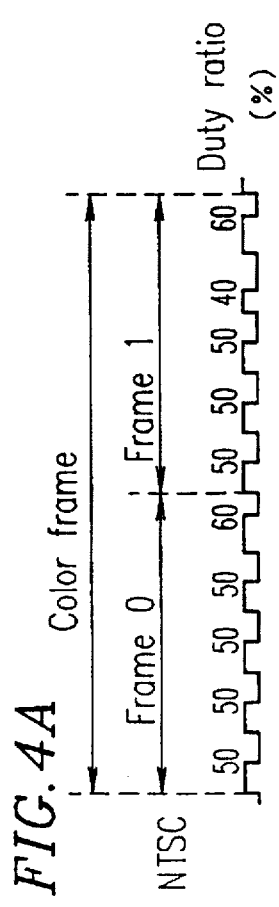
FIGS. 4A and 4B are waveform charts of the control signal in an NTSC method and a PAL method to which the present invention is applicable.
Figure 4B:
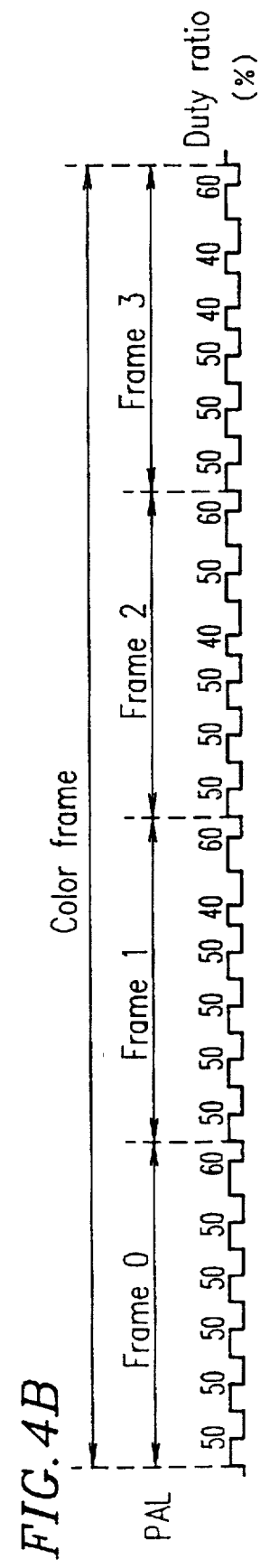

FIGS. 4A and 4B are waveform charts of the control signal in an NTSC method and a PAL method to which the above-described embodiments are applied. In the NTSC method shown in FIG. 4A, one color frame consists of frames "0" and "1". On the other hand, in the PAL method shown in FIG. 4B, one color frame consists of frames "0" to "3".

Figure 5A:
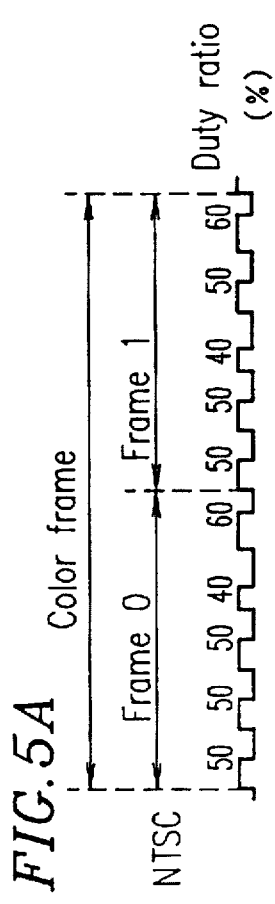
FIGS. 5A and 5B are waveform charts of the control signal in an NTSC method and a PAL method in which an average duty ratio is 50%.
Figure 5B:
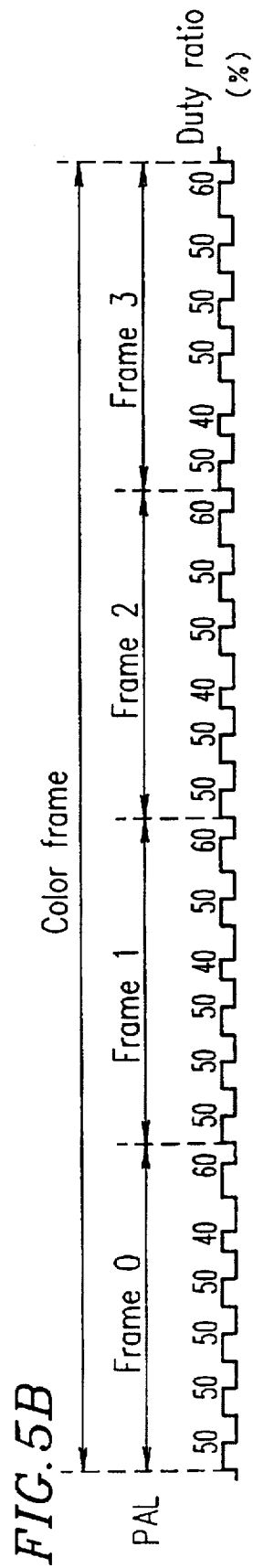
Figure 6:
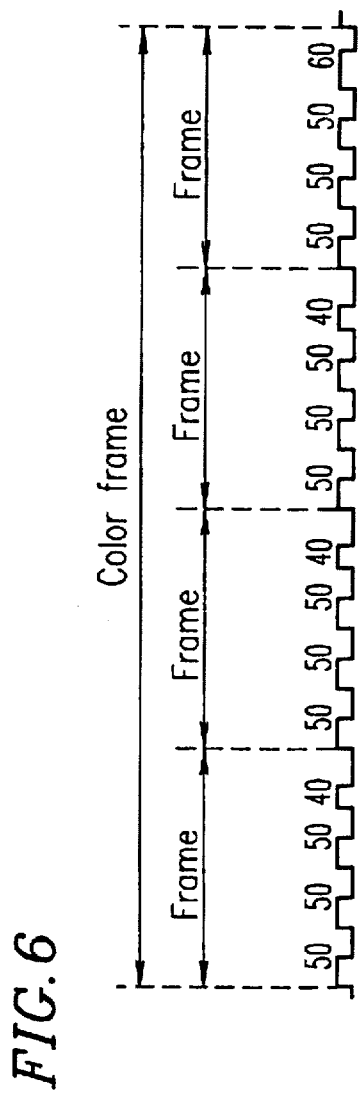
FIG. 6 is a waveform chart illustrating a conventional recording method for a control track.

As described above, the duty ratio of a control pulse is preferably 50%. Therefore, it is more preferable that an average duty ratio in one color frame is 50%. FIGS. 5A and 5B are waveform charts of the control signal in an NTSC method and a PAL method in which an average duty ratio is 50%. The composition of a color frame in FIGS. 5A and 5B is similar to that shown in FIGS. 4A and 4B. However, in FIGS. 5A and 5B, an average duty ratio in one color frame is calculated to be 50%, unlike the case shown in FIGS. 4A and 4B. As a result, even when the speed of a tape is higher than the speed for a normal reproduction, it is possible to decide a duty ratio with high precision.

As described above, according to the method of the present invention, a control signal is recorded on a control track on a tape so as to correspond to a number M (where M is an integer equal to or larger than four) of azimuthal tracks on the tape on which the number M of segmented data, obtained by dividing data corresponding to one frame into the number M of segments, are recorded. In this method, a control pulse of one period corresponds to a number N (where N is a divisor of M, M=NL, and L is an integer) of azimuthal tracks, a group of control pulses of a number L of periods corresponding to one frame have a duty pattern in which duty ratios of respective pulses are selectively varied, a different duty pattern is applied to each of a number K (where K is an integer equal to or larger than two) of successive frames, and the control signal is recorded on the control track on the tape by cyclicly repeating the duty patterns corresponding to the number K of frames. As a result, the phase of the number K of frames can be detected on a frame basis during the reproduction operation. Therefore, the phase can be detected in a short period of time on K frames basis, and a rapid operation is enabled for a connection recording or the like in a VCR.

Moreover, the duty pattern of the group of control pulses is composed of a first duty ratio, a second duty ratio and a third duty ratio, the three kinds of duty ratios being different from each other, a pulse having the first duty ratio is located at the same predetermined position in each of the frames, and pulses having the second and the third duty ratios are located in each of the number K of frames so that an arrangement of the two pulses is peculiar to each of the number K of frames. As a result, it becomes easy to form an encoder during the recording operation and a decoder during the reproduction operation.

In addition, an arrangement pattern of the pulse having the second duty ratio with respect to the pulse having the third duty ratio is made to correspond to a binary code indicating a frame number in the number K of frames. As a result, it becomes easy to form an encoder during the recording operation and a decoder during the reproduction operation.

Furthermore, the control pulse having the first duty ratio corresponds to the number N of tracks at a trailer of each frame and the group of control pulses corresponding to the binary code are arranged immediately before the control pulse having the first duty ratio. As a result, it becomes easier to form an encoder during the recording operation and a decoder during the reproduction operation.

Furthermore, one of the first, the second and the third duty ratios is in a range of 45 to 55% (preferably about 50%), another is a range of 35 to 45% (preferably about 40%), and the other is in a range of 55 to 65% (preferably about 60%). As a result, the duties of the control signal can be precisely recorded/reproduced without being affected by the recording/reproduction characteristics.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A method for recording control pulses on a control track, the control pulses corresponding to a number M (where M is an integer equal to or larger than four) of azimuthal tracks on the tape on which the number M of segmented data are recorded, comprising the steps of:

dividing image data corresponding to one frame into the number M of segments, recording the segmented data on the azimuthal tracks, and recording the control pulses on the control track, wherein one period of the control pulses corresponds to a number N (where N is a divisor of M) of azimuthal tracks;

a duty ratio pattern of the control pulses in a number L (L=M/N) of successive periods corresponding to one frame is different in each of a number K (where K is an integer equal to or larger than two) of successive frames;

the duty ratio pattern includes at least two of three kinds of control pulses having a first, a second and a third duty ratio, respectively; the control pulse having the first duty ratio is located at the same positions in each of the number K of successive frames; and the duty ratio pattern of the control pulses having the second and the third duty ratios is different in each of the number K of successive frames.

2. A recording method for a control track according to claim 1, wherein the pattern of the second and the third duty ratios corresponds to a binary code composing of 0 and 1.

3. A recording method for a control track according to claim 2, wherein the binary code indicates a frame number of the number K of successive frames.

4. A recording method for a control track according to claim 3, wherein the control pulse having the first duty ratio, among the control pulses in the number L of periods corresponding to one frame, is an L-th control pulse, and the control pulses having the second and the third duty ratios are located within a range where a first to an (L-1)th control pulses are located.

5. A recording method for a control track according to claim 4, wherein one period of the control pulses corresponds to two azimuthal tracks.

6. A recording method for a control track according to claim 1, wherein the number K of successive frames compose one color frame, and an average duty ratio in the color frame is 50%.

7. A recording method for a control track according to claim 1, wherein the first duty ratio is in a range of 45% to 55%, and one of the second and the third duty ratios is in a range of 35% to 45% and the other is in a range of 55 to 65%.

8. An apparatus for recording control pulses on a control track, the control pulses corresponding to a number M (where M is an integer equal to or larger than four) of azimuthal tracks on the tape on which the number M of segmented data, obtained by dividing image data corresponding to one frame into the number M of segments, are recorded, wherein one period of the control pulses corresponds to a number N (where N is a divisor of M) of azimuthal tracks, wherein a duty ratio pattern of the control pulses in a number L (L=M/N) of successive periods corresponding to one frame is different in each of a number K (where K is an integer equal to or larger than two) of successive frames;

and wherein the duty ratio pattern includes at least two of three kinds of control pulses having a first, a second and a third duty ratio, respectively; the control pulse having the first duty ratio is located at the same position in each of the number K of successive frames; and the duty ratio pattern of the control pulses having the second and the third duty ratios is different in each of the number K of successive frames.

9. A recording apparatus for a control track according to claim 8, wherein the pattern of the second and the third duty ratios corresponds to a binary code composing of 0 and 1.

10. A recording apparatus for a control track according to claim 9, wherein the binary code indicates a frame number of the number K of successive frames.

11. A recording apparatus for a control track according to claim 10, wherein the control pulse having the first duty ratio, among the control pulses in the number L of periods corresponding to one frame, is an L-th control pulse, and the control pulses having the second and the third duty ratios are located within a range where a first to an (L-1)th control pulses are located.

12. A recording apparatus for a control track according to claim 11, wherein one period of the control pulses corresponds to two azimuthal tracks.

13. A recording apparatus for a control track according to claim 8, wherein the number K of successive frames compose one color frame, and an average duty ratio in the color frame is 50%.

14. A recording apparatus for a control track according to claim 9, wherein the first duty ratio is in a range of 45% to 55%, and one of the second and the third duty ratios is in a range of 35% to 45% and the other is in a range of 55 to 65%.

* * * * *

UNITED STATES PATENT AND TRADE MARK OFFICE
CERTIFICATE OF CORRECTION

PATENT NO.   : 5,793,925
DATED        : August 11, 1998
INVENTOR(S)  : Sakakibara et al.

It is certified that error appears in the above-identified patent and that said Letters Patent is hereby corrected as shown below:

On the cover page, item [56] References Cited, Foreign Patent Documents, "2 151 88 7/1985 United Kingdom" should be --2 151 818 7/1985 United Kingdom--.

On the cover page, item [56] References Cited, Other Documents, add the following --European Search Report dated 4/8/97.--

Column 12, line 11, delete "9" and insert --8--.

Signed and Sealed this

Second Day of March, 1999

*Attest:*

Q. TODD DICKINSON

*Attesting Officer*  Acting Commissioner of Patents and Trademarks